United States Patent
Sridhar et al.

(10) Patent No.: US 7,314,606 B2
(45) Date of Patent: Jan. 1, 2008

(54) RECOVERY OF SODIUM THIOCYANATE FROM INDUSTRIAL PROCESS SOLUTION USING NANOFILTRATION TECHNIQUE

(75) Inventors: Sundergopal Sridhar, Hyderabad (IN); Suryanarayana Murthy Gorugantu, Hyderabad (IN); Suhanya Duraiswamy, Hyderabad (IN); Smitha Biduru, Hyderabad (IN); Ramakrishna Machiraju, Hyderabad (IN)

(73) Assignee: Council of Scientific and Industrial Research, New Delhi (IN)

( * ) Notice: Subject to any disclaimer, the term of this patent is extended or adjusted under 35 U.S.C. 154(b) by 278 days.

(21) Appl. No.: 10/812,586

(22) Filed: Mar. 29, 2004

(65) Prior Publication Data

US 2005/0214192 A1  Sep. 29, 2005

(51) Int. Cl.
*C01C 3/20* (2006.01)
*B01D 61/00* (2006.01)

(52) U.S. Cl. .................. 423/366; 210/650; 210/651

(58) Field of Classification Search ............... 210/650, 210/651; 423/366
See application file for complete search history.

(56) References Cited

U.S. PATENT DOCUMENTS

| 4,415,677 A | 11/1983 | Lee et al. ............... 521/28 |
| 4,636,376 A | 1/1987 | Maloney et al. ........... 423/475 |
| 4,702,805 A | 10/1987 | Burkell et al. ........... 205/503 |
| 5,071,563 A | 12/1991 | Shiga et al. ............. 210/670 |
| 5,858,240 A | 1/1999 | Twardowski et al. ....... 210/652 |

FOREIGN PATENT DOCUMENTS

| JP | 04321514 A | 11/1992 |
| JP | 04338110 A | 11/1992 |

OTHER PUBLICATIONS

"Application of membrane separation impurity removal process in PAN production". Yuan, Hua-bin; Jin, Zhen. Shihua Jishu Yu Yingyong, 20(6), 385-387, 391 (Chinese) 2002. (no month, Abstract only).*

* cited by examiner

*Primary Examiner*—Wayne A. Langel
(74) *Attorney, Agent, or Firm*—Rutan & Tucker, LLP

(57) ABSTRACT

The present invention relates to a membrane-based nanofiltration process for separating sodium thiocyanate (NaSCN) from industrial solution containing impurities such as β-sulfopropionic acid, β-sulfopropionitrile, sodium sulfate and salts of iron and calcium in a single step to obtain a colorless aqueous solution for spinning of acrylic fiber in textile industry.

11 Claims, 3 Drawing Sheets

RECOVERY OF SODIUM THIOCYANATE FROM INDUSTRIAL PROCESS SOLUTION USING NANOFILTRATION TECHNIQUE

FIELD OF THE INVENTION

The present invention relates to a process for the recovery of sodium thiocyanate from industrial process solution by membrane based nanofiltration technique. More particularly, the present invention relates to the separation of sodium thiocyanate (NaSCN) from undesirable compounds, particularly, color and bivalent salts from an aqueous industrial process solution by nanofiltration technique using a polymeric membrane. The present invention also relates to a process for substantially rejecting bivalent ions like sulfates, salts of Fe, Ca and other organic compounds like β-sulfo propionic acid, β-sulfo propionitrile during permeation of NaSCN with water. Sulfate ion is a common ingredient in these types of effluents. When such solution is used directly, the sulfate ions and other color imparting components deteriorate the fibre quality.

BACKGROUND AND PRIOR ART DESCRIPTION

Reference may be made to U.S. Pat. No. 5,858,240, Twardowski, Zbigniew, Ulan and Judith issued on Jan. 12, 1999, which describes the removal of sodium chloride from concentrated aqueous solutions where sodium chloride is permeated with simultaneous rejection of other compounds like sodium sulfate to provide a pass solution with high concentration of multivalent ions.

Reference may be made to U.S. Pat. No. 4,702,805, Burkell and Warren, issued on Oct. 27, 1987, which describes an improved method for the control of sulfate concentration in an electrolyte stream in a crystalline chlorate plant, whereby the sulfate is crystallized out. In the production of crystalline sodium chlorate according to U.S. Pat. No. 4,702,805, sodium chlorate is crystallized from sodium chlorate rich liquor. The crystals are removed to provide a mother liquor comprising principally of sodium chlorate and sodium chloride, together with other components, including sulfate and dichromate ions. A portion of the mother liquor is cooled to a temperature to effect crystallization of a portion of the sulfate as sodium sulfate in admixture with sodium chlorate. The crystallized admixture is removed and the resulting spent method liquor is recycled to the electrolytic process.

Reference may be made to a process described in U.S. Pat. No. 4,702,805, wherein the crystallized admixture of sulfate and chlorate obtained from typical commercial liquors may be discolored yellow owing to the unexpected occlusion of a chromium component in the crystals. The discoloration cannot be removed by washing the separated admixture with liquors in which the crystallized sulfate and chlorate are insoluble. It will be appreciated that the presence of chromium in such a sulfate product is detrimental in subsequent utilization of this product and, thus, this represents a limitation to the process as described in U.S. Pat. No. 4,702,805.

Reference may be made to U.S. Pat. No. 4,636,376—Maloney and Carbaugh, issued Jan. 13, 1987, which discloses a process for removing sulfate from aqueous chromate-containing sodium chlorate liquor without simultaneous removal of significant quantities of chromate. The chromate and sulfate-containing chlorate liquor having a pH in the range of about 2.0 to about 6.0 is treated with a calcium-containing material at a temperature range between about 40.degree. C. and 95.degree. C., for time period between 2 and 24 hours to form a sulfate-containing precipitate. The precipitate is predominantly glauberite, $Na_2 Ca (SO_4)_2$. However, the addition of calcium cations requires extra expenditure and effort for the treatment and removal of all excess calcium ions. It is known that calcium ions may form an unwanted deposit on the cathodes which increases the electrical resistance of the cells and adds to operating costs. The calcium ions are removed by means of ion exchange resins.

Reference may be made to U.S. Pat. No. 4,415,677, which describes a method for sulfate ion adsorption. Typically, organic anion exchange resins have a low selectivity for sulfate anions in the presence of a large excess of chlorine ions. The method consists of removing sulfate ions from brine by a macroporous ion exchange resin composite having polymeric zirconium hydrous oxide contained in a vessel. This method has many disadvantages. This method is not economical because the efficiency is low and a large amount of expensive cation exchange resin is required for carrying zirconium hydrous oxide adsorbent. Further, the polymer loaded with zirconium hydrous oxide comes into contact with acidic brine containing sulfate ions, resulting in loss of the adsorbent due to acid-induced dissolution. Soluble zirconyl ions precipitates as hydroxide in the lower portion of the vessel and clogs flow paths.

Reference may be made to U.S. Pat. No. 5,071,563—Shiga et al., issued Dec. 10, 1991, which describes the selective adsorption of sulfate anions from brine solutions using zirconium hydrous oxide slurry under acidic conditions. The ion exchange compound may be regenerated by treatment with alkali.

Reference may be made to Japanese Patent Kokai No. 04321514-A, published Nov. 11, 1992 to Kaneka Corporation, which describes the selective adsorption of sulfate anions from brine solutions using cerium hydroxide slurry under acidic conditions. The ion exchange compound may be regenerated by treatment with alkali.

Reference may be made to Japanese Patent Kokai No. 04338110-A—Kaneka Corporation, published Nov. 25, 1992, which describes the selective adsorption of sulfate anions from brine solutions using titanium hydrous oxide slurry under acidic conditions. The ion exchange compound may be regenerated by treatment with alkali.

The main drawbacks in these and other separation techniques like adsorption, ion exchange etc., which attempt to remove monovalent ions, is the failure of these systems to selectively and economically remove the monovalent ions in a single step from bivalent ions and organic compounds. Substantial portions of the commercially available anion exchange resins are required to sorb sulfate ions. Regeneration of the resins is similarly inefficient because of the need to desorb sulfate ions.

The literature available from the patents describe only the removal of sodium chloride with respect to the Chlor alkali, brine and other industrial solutions. A proper process is absent for the color removal and selective separation of sodium thiocyanate from textile industries. Also the processes described have a very low flow rate which makes them unfeasible on a commercial scale.

Therefore there still remains, a need for an improved, cost-effective, practical method for the removal of sulfate, silica, calcium and iron ions from alkali metal halide solutions, and also organic compounds present if any, particularly from these type of effluents which are used in the spinning of fibres for textile industries.

OBJECTS OF THE INVENTION

The main object of the present invention is to provide a process for the recovery of sodium thiocyanate from industrial process solution by membrane based nanofiltration technique, which obviates the drawbacks as detailed above.

An object of the present invention is to provide a multi-stage process involving intermittent dilution of the feed with deionized water to facilitate maximum possible recovery of sodium thiocyanate in permeate with maximum rejection of impurities.

A further object of the invention is to provide a process for reducing the color of the permeate solution.

A still further object of the invention is to remove sodium sulfate from aqueous sodium thiocyanate solution used for spinning of acrylic fibre.

A still further object of the invention is to remove Ca, Fe present in aqueous sodium thiocyanate solution used for spinning of acrylic fibre.

Another object of the invention is the removal of β-Sulfo propionic acid, β-Sulfo propionitrile, low molecular weight polymer and other impurities present in the feed solution.

Yet another object of the present invention is to identify a chemically resistant membrane, which yields maximum recovery of sodium thiocyanate at optimum flux with highest degree of impurity and color rejection.

Still another object of the invention is to compare the performance of different Nanofiltration membranes amongst Cellulose triacetate, Polyamide, Hydrophilised polyamide, with respect to permeate flux and extent of impurity rejection achievable.

Still further object of the present invention is to recover atleast 85–90% of the sodium thiocyanate in the permeate.

A still further object is to optimize the pressure at which maximum enrichment of sodium thiocyanate in the permeate is achievable.

Still another object of the present invention is to identify the ideal molecular weight cut-off for best membrane material that gives enrichment of sodium thiocyanate in permeate with rejection of 55–60% of the impurities.

Still another object of the present invention is to identify the ideal membrane material that achieves color rejection of atleast 70%.

Another object of the present invention is to identify the actual range of pressure at which the process can be operated that gives the maximum recovery of sodium thiocyanate.

Another object of the present invention is to identify the dilution ratios for which maximum recovery of sodium thiocyanate can be achieved.

Another object of the present invention is to identify the optimal flux ranges at which the variables of the system can be fixed.

BRIEF DESCRIPTION OF THE ACCOMPANYING DRAWINGS

In the drawings accompanying this specification,

DETAILED DESCRIPTION OF THE PRESENT INVENTION

Accordingly, the present invention relates to a process for recovery of sodium thiocyanate from industrial process solution containing undesirable components such as organic or inorganic compounds, color imparting ions and bivalent salts by membrane based nanofiltration technique said process comprising the steps of passing the industrial process solution as a feed solution through a nanofiltration member with simultaneous application of positive pressure to provide a pass solution and a permeate solution, wherein the permeate solution is substantially devoid of the undesirable components and evaporating the permeate solution to obtain sodium thiocyanate.

In an embodiment of the present invention, the feed solution contains undesired components of bivalent, color imparting ions and other organic and inorganic compounds.

In another embodiment of the present invention, the feed solution contains sodium thiocyanate in a concentration in excess of 100 gpl.

In yet another embodiment of the present invention, the feed solution contains sodium thiocyanate in a concentration between 110 gpl and 120 gpl.

In still another embodiment of the present invention, wherein organic components present in the feed solution is selected from the group consisting of β-Sulfo propionic acid and β-Sulfo propionitrile.

In one more embodiment of the present invention, the desired component in permeate is sodium thiocyanate.

In one another embodiment of the present invention, the process may comprise of multiple stages wherein the pass solution from a previous stage is diluted using distilled water and used as feed solution for a next stage.

In a further embodiment of the present invention, the feed solution or the diluted pass solution is passed through one or more nanofiltration membrane modules connected in series so as to produce second and/or subsequent pass solutions, consecutively, which are then finally disposed.

In a further more embodiment of the present invention, the nanofiltration membrane used is selected from the group consisting of cellulose triacetate membrane, polyamide membrane and hydrophilised polyamide membrane.

In another embodiment of the present invention, the nanofiltration membrane has active membrane area of about 1 m$^2$.

In yet another embodiment of the present invention, the pressure applied to the feed solution at the time of passing the same through the nanofiltration membrane is equal to or greater than osmotic pressure difference between the feed/pass solution on one side and the permeate solution of the other side of the membrane.

In still another embodiment of the present invention, the process is operated under flux whose value is in the range of 25 to 40 Lm$^2$hr$^{-1}$.

The invention if further described in detail in the following paragraphs with reference to the accompanying drawings.

Figure 1:
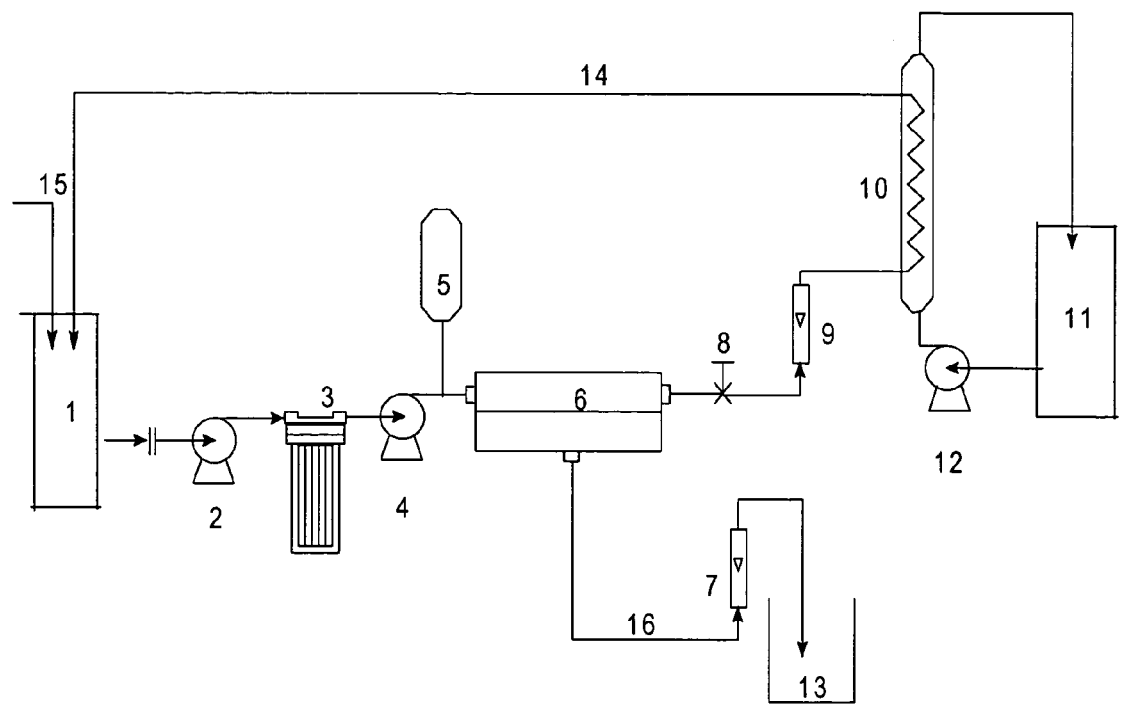
FIG. 1 represents a diagrammatic flow sheet of a single stage nanofiltration membrane system for use in a process according to the invention.

FIG. 1 shown generally as S1, a single stage membrane nanofiltration system for the separation of, for example, sodium thiocyanate from aqueous solution. System S1 comprises a feed solution holding tank 1 connected to a nanofiltration membrane module, 6, by a feed conduit 15, through a high pressure pump, 4 (Prakash Pumps Ltd. Model I-2401). Module 6 comprises a single spiral wound type nanofiltration module containing either cellulose triacetate membrane, 23, PERMA-2521 polyamide membrane, 24, hydrophilised polyamide membrane-400, 25, having 1 m.sup.2 of active membrane area. Exiting module 6 is a pass recycle conduit, 14, used to recycle the pass stream to tank 1 having a pressure control valve, 8, and a permeate stream conduit 16.

The process depicted in FIG. 1 represents a single stage or batch-type process, wherein the pass stream may be of sufficient and desired quality for use in a subsequent process or discharge. However, each of the pass, optionally, individually, may be sent through a nanofiltration membrane process again, in one or more cycles, in either a batch or continuous process. In industrial processes of use in the practice of the invention, the pass stream from the first stage may be sent to the second stage to increase the overall percentage recovery. Alternatively, the NF process may be conducted in a batch mode with the pass solution recycled back to the feed tank. Accordingly, in consequence, the feed composition will vary with time as will the membrane flux and possibly the percentage rejection.

Figure 2:
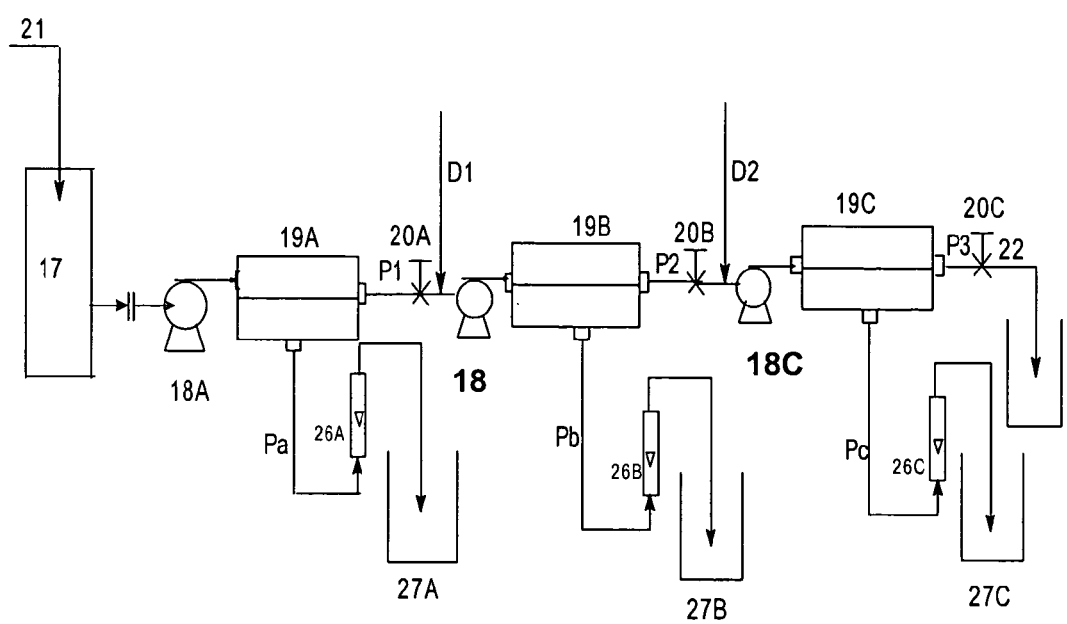
FIG. 2 represents a diagrammatic flow sheet of a multi-stage nanofiltration membrane system for use in a process according to the invention.

FIG. 2 shown generally as S2, represents a multi-stage NF method for the extraction of sodium thiocyanate from aqueous solution, according to the invention, wherein a plurality of NF membrane modules three in the embodiments shown and numbered 19A–19C, consecutively, are connected in series. Feed solution is fed under pressure by high pressure pump, 18A, to module 19A. Pass streams P1–P3 are passed to subsequent adjacent modules, wherein the streams are diluted accordingly with deionized water flowing through streams D1 and D2, and pressure control valves 20A–20C are used to maintain a constant pressure throughout the run. The permeate streams Pa–Pc may be combined into a single resultant purified permeate stream and the final pass stream, 22, may be sent for evaporation or may be collected.

Figure 3:
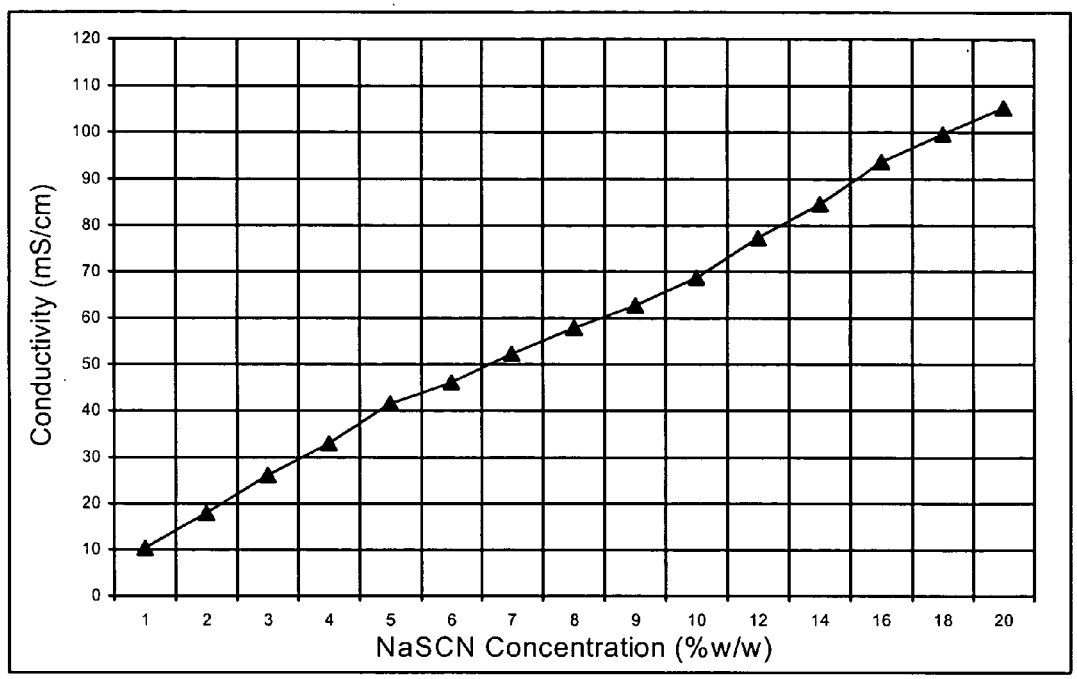
FIG. 3 represents a diagrammatic flow sheet of the conductivity versus the concentration of sodium thiocyanate as described in the process according to the invention.

FIG. 3 shown generally as S3, represents the graph used to determine the concentration of the sodium thiocyanate in the feed, permeate and reject, during the course of the run. It was observed that the concentration of sodium thiocyanate attained from the graph was ±5% of values attained by potentiometric titration.

In the present invention the feed solution is tested with different membrane modules like cellulose triacetate 23, polyamide 24, and hydrophilized polyamide (HPA-400) (Molecular weight cut-off 400) 25, to find the membrane which produces the best separation characteristics at optimum flux. The conductivity of the solutions is determined using a digital conductivity meter.

The dilution ratio to which the reject liquor is to be treated after each stage of operation is determined, which is then processed as the feed solution for the next stage of operation. Also, the number of the stages involved to obtain the maximum recovery of sodium thiocyanate is determined. Further, the feed, permeate and pass streams are analyzed through potentiometric titration method to find the concentration of the desired component and other impurities. Ideal commercial membrane is chosen based on optimum flux attainable in association with highest degree of impurity rejection.

Reverse osmosis (RO), ultrafiltration (UF) and nanofiltration (NF) are being used as pressure driven membrane process wherein organic molecules or inorganic ionic solutes in aqueous solutions are concentrated or separated to various degrees by the application of a positive osmotic pressure to one side of a filtration membrane. These processes employ a cross-flow mode of operation wherein only a portion of a feed solution (F) is collected as permeate solution (P) and the rest is collected as pass solution (R).

When a separation of a compound from a solution containing impurities is required, a high percentage recovery of the compound and a high rejection of the impurities in association with high permeate flux is desired.

Nanofiltration membranes are structurally very similar to Reverse osmosis membranes in that chemically, they, typically, are crosslinked aromatic polyamides, which are cast as a thin "skin layer", on top of a microporous polysulfone polymer sheet support to form a composite membrane structure. The separation properties of the membrane are controlled by the pore size and electrical charge of the "skin layer". Such a membrane structure is usually referred to as a thin film composite (TFC). However, unlike RO membranes, the NF membranes are characterized in having a larger pore size in its "skin layer" and a net negative electrical charge inside the individual pores. This negative charge is responsible for rejection of anionic species, according to the anion surface charge density. Accordingly, divalent anions, such as SO.sub.4.sup.−2, are more strongly rejected than monovalent ones, such as CN.sup.−.

Commercial NF membranes are available from known suppliers of RO and other pressure driven membranes. Examples include: Permionics NF-2540 membranes (Permionics India Ltd., Baroda, Gujarat, India.), NF50, NF100, NF250 and NF400 HPA membranes. The NF membranes are, typically, packaged as membrane modules. A so-called "spiral wound" module is most popular, but other membrane module configurations, such as hollow fiber or tubular membranes are also known.

Nanofiltration membranes have been reported to show zero or little rejection of low molecular weight organic molecules, such as, methanol, ethanol and ethylene glycol, but a significant rejection of higher molecular weight organic species, such as glucose. Among inorganic ionic solutes, low to medium rejection has been reported for simple electrolytes, such as NaCl or NaSCN and high rejection of other electrolytes where multivalent ionic species are involved, such as Na.sub.2 SO.subsub.4, MgCl.sub.2 and CaCl.sub.2. Such a characteristic differentiates NF from RO, which rejects all ionic species, and from ultrafiltration (UF), which does not reject ionic species and only rejects organic compounds with molecular weights, typically, in excess of 1,000.

During the NF process, a minimum pressure equal to the osmotic pressure difference between the feed/pass solution on one side and the permeate solution on the other side of the membrane must be applied since osmotic pressure is a function of the ionic strengths of the two streams. In the case of separation of a multivalent solute, such as Na.sub.2 SO.sub.4, from a monovalent one, such as NaSCN, the osmotic pressure difference is moderated by the low NaSCN rejection. Usually, a pressure in excess of the osmotic pressure difference is employed to achieve practical permeate flux. In view of lower NaSCN rejection, NF has been used successfully for removal of sulfate and the cations contributing to hardness, Ca.sup.2+ and Mg.sup.2+ from brackish waters and even seawater, without the necessity to excessively pressurize the feed stream. The reported typical pressure range for NF is 100 to 300 psi, although membrane elements are designed to withstand pressures up to 600 psi.

The process adopted by the industries involves the usage of Activated carbon Filter and Leaf Filter for the removal of some of the impurities present along with sodium thiocyanate in the aqueous solution. The cake of the Leaf Filter is rich in NaSCN, which is then dissolved in water, centrifuged and the filtrate of the centrifuge is sent to a Gel Filtration Column, wherein the remaining impurities are removed by chromatographic separation. The entire process involves the usage of many stages and proves uneconomical with a very low flow rate and recovery.

Accordingly, the present invention provides a nanofiltration process for the recovery of sodium thiocyanate from industrial process solution by processing the feed solution through a nanofiltration membrane module under a positive pressure to provide a reject containing the impurities and color and a permeate containing enriched sodium thiocyanate solution.

The processes of the invention, as hereinabove defined, may comprise further treatment of the reject stream. For example, the reject is diluted and further treated with nanofiltration membranes to extract the remaining sodium thiocyanate for higher recovery and a final reject stream with negligible concentration of sodium thiocyanate for disposal.

The processes of the invention are applicable as either single stage batch processes with optional recycle of either pass liquor or permeate liquor to the nanofiltration membrane module, or as part of a multi-stage, multi-module system.

The processes of the invention are applicable as the pass stream is further diluted in a multistage operation wherein the remaining desired monovalent ion is further extracted in the subsequent stage.

The process of the invention as hereinabove defined may be operated at any suitable and desired temperature selected from 27. degree. C. to 38. degree. C. of the feed stream; and positive pressures applied to the feed side, generally selected from 100–600 psi.

The process of the invention as hereinabove defined may be operated at an optimum flux of 25–40 lit.m.sup.-2.hr.sup.-1. Flux below 10 lit.m.sup.-2.hr.sup.-1, will be uneconomical unless the product is too expensive. Flux greater than 45 lit.m.sup.-2.hr.sup.-1, is avoided to minimize the concentration polarization and fouling due to rapid increase in concentration of solute molecules on the membrane surface.

Preferably, the sodium thiocyanate is at a concentration of greater than 100 gpl, more preferably greater than 110 gpl in the initial feed solution.

The following examples are given by way of illustration to portray the efficacy of the separation characteristics of the Nanofiltration membrane in separating NaSCN as described by FIG. 1 and FIG. 2 wherein data was collected using an experimental NF test rig which consisted of a single NF membrane filter element, 2.5" diameter, 21" long, containing Permionics CTA, 23, for batch operation, and polyamide, 24, and HPA 400 membrane, 25, for continuous operation, from Permionics India Ltd. The active membrane area was 2.5 m.sup.2. All runs were conducted at temperature 27.degree.–32.degree. C. and therefore should not be construed to limit the scope of the present invention.

EXAMPLE 1

A batch of 50 liters containing 135.1 gpl of NaSCN at 30.degree. C. was fed to feed tank 1. High-pressure pump, 4, was turned on and the pressure on the feed side was maintained at 21 bar throughout the run. The feed was processed through a Cellulose triacetate membrane, 23, and following the run, permeate was collected in separate tank over a period of 86 minutes. The pass stream flow rate was kept constant at 17 liters per minute. A recovery of 60% was collected as permeate volume with an average flux between 28 lit.m.sup.-2.hr.sup.-1 and 29 lit.m.sup.-2.hr.sup.-1. The color and impurity rejections were found to be 76.5% and 66.4% respectively. The feed, pass and permeate samples were analyzed for NaSCN and color and the results are tabulated in table 1 given below.

TABLE 1

| Quality parameters | Feed | Permeate | Pass |
|---|---|---|---|
| NaSCN(%) | 13.51 | 16.88 | 11.27 |
| % Total impurities | 5.54 | 3.17 | 9.42 |
| Color APHA | 98 | 23 | 209 |

EXAMPLE 2

A batch of 30 liters of feed solution containing 129 gpl of sodium thiocyanate is diluted in the ratio 1:0.5, reducing the concentration of sodium thiocyanate to 86 gpl, thereby making the volume to 45 liters and was fed to feed tank, 17, at a temperature of 28.degree. C. High pressure pump, 18A, was turned on and the pressure on the feed side was adjusted to 24 bar using pressure control valve 20A and was maintained constant during the run. The feed was processed through a polyamide (PA-300), 24, spiral wound membrane module 19A. The pass stream flow rate was kept constant at 17 liters per minute whereas the permeate flow rate 26A varied during the run. 27 liters of permeate volume was collected in a separate tank 27A over a period of 254 minutes for a volume recovery of 60%. The impurity and color rejections were found to be 94% and 97% respectively. The remaining 18 liters was left in the tank and within the system. The feed stream, pass stream and permeate stream are analyzed for % NaSCN, % total impurities and color and results are tabulated in Table 2 given below.

TABLE 2

| Quality Parameters | Feed | Permeate | Pass |
|---|---|---|---|
| NaSCN (Conc %) | 8.6 | 10.33 | 6.54 |
| Total impurities (%) | 5.54 | 0.54 | 11.26 |
| βSPA (%) | 0.06 | 0.04 | 0.11 |
| βSPN (%) | 0.24 | Nil | 0.4 |
| $Na_2SO_4$ | 4.68 | 0.38 | 9.77 |
| NaCl (%) | 0.07 | 0.06 | 0.06 |
| Fe (ppm) | 0.46 | 0.14 | 0.58 |
| Ca(ppm) | 72.4 | 31.0 | 154 |
| APHA | 198 | 4.0 | 413 |

EXAMPLE 3

In this Example, the pass stream P1 of Example 2 was diluted with distilled water in the ratio 1:0.5 and a total volume of 30 liters containing 37.3 gpl of NaSCN was run through a polyamide membrane module 19B. Pressure on the feed side was adjusted to 24 bar using pressure control valve 20B and was maintained constant during the run. The pass stream flow rate was constant during the run at 17 liters per minute. 15 liters of the permeate was collected for a duration of 172 minutes obtaining an overall volume recovery of 50%. The impurity and color rejections were found to be 95% and 98% respectively. The feed stream, pass stream and permeate stream were analyzed for % NaSCN, % total impurities and color and results are tabulated in Table 3.

TABLE 3

| Quality Parameters | Feed | Permeate | Pass |
|---|---|---|---|
| NaSCN Conc (%) | 3.73 | 5.3 | 2.57 |
| Total impurities (%) | 6.26 | 0.67 | 11.13 |
| βSPA (%) | 0.14 | 0.08 | 0.27 |
| βSPN (%) | 0.10 | 0.06 | 0.32 |
| $Na_2SO_4$ | 5.69 | 0.42 | 10.14 |
| NaCl (%) | 0.07 | 0.03 | 0.07 |
| Ca(ppm) | 80.6 | 11.65 | 155 |
| Color(APHA units) | 239 | 3.0 | 447 |

EXAMPLE 4

In this Example, the pass stream P2 of the Example 3 was diluted using distilled water in the ratio 1:0.75 and a total volume of 20 liters containing 11.9 gpl of NaSCN was run through polyamide membrane module 19C. The pressure was maintained using a pressure control valve 20C at 24 bar. 10 liters of permeate is collected with an overall volume recovery of 50%. The impurity and color rejections were found to be 97% and 98% respectively. The feed, pass and permeate samples were analyzed for % NaSCN, % total impurities and color and the results are tabulated in Table 4.

TABLE 4

| Quality Parameters | Feed | Permeate | Pass |
|---|---|---|---|
| NaSCN (conc %) | 1.19 | 1.84 | 0.73 |
| Total impurities (%) | 5.06 | 0.25 | 8.48 |
| βSPA (%) | 0.49 | 0.09 | 0.92 |
| βSPN (%) | 0.15 | 0.03 | 0.22 |
| $Na_2SO_4$ | 4.27 | 0.08 | 7.16 |
| NaCl (%) | 0.05 | 0.04 | 0.04 |
| Fe (ppm) | 0.31 | NA | 0.42 |
| Ca(ppm) | 84.3 | 10.2 | 167 |
| Color (APHA) | 234 | 13 | 422 |

The average flux for Examples 2–4 ranged from 5 lit.m.$^{-2}$.hr.$^{-1}$ and 10 lit.m.$^{-2}$.hr.$^{-1}$.

EXAMPLE 5

Comparative Example of HPA-400 Batch and Continuous Processes

In the batch operation, the original feed containing 120 gpl of NaSCN was fed to a feed tank 1. High-pressure pump 4 was turned on and maintained at 24 bar throughout the process using pressure control valve, 8. The feed solution is then passed through HPA-400 spiral wound membrane module no 6 and the pass stream flow rate maintained at 17 liters per minute was recycled back into the feed tank. An overall volume recovery of 60% consisting of 129.1 gpl of NaSCN was achieved with an average flux in between 64 lit.m.sup.–2.hr.sup.–1 and 69 lit.m.sup.–2.hr.sup.–1. The color and impurity rejections were found to be 97% and 73% respectively.

In continuous operation a second batch feed containing 114.6 gpl of NaSCN is fed to the tank 1. High-pressure pump, 18A, was turned on and was maintained constant at 24 bar for the entire run using pressure control valve 20A. The feed solution was then passed through membrane module 19A containing HPA-400, membrane 25. The pass stream flow rate was maintained at 2 liters per minute and then fed to the next membrane module. A recovery by volume of 60% was achieved with respect to this membrane module no 19A in a time period of 70 min with an average flux in between 39 lit.m.sup.–2.hr.sup.–1 and 40 lit.m.sup.–2.hr.sup.–1. The color and impurity rejections were found to be 80% and 72% respectively. The comparison of % rejection, % NaSCN and % total impurities of batch and continuous operation are tabulated in Table 5 given below.

TABLE 5

| Quality parameters | Hydrophilized polyamide HPA-400 Continuous mode | | | Hydrophilized polyamide HPA-400 Batch mode | | |
|---|---|---|---|---|---|---|
| | Feed | Permeate | Pass | Feed | Permeate | Pass |
| NaSCN % | 11.46 | 12.25 | 10.28 | 11.84 | 12.91 | 10.7 |
| Color | 179 | 35 | 409 | 241 | 8.0 | 530 |
| % Total Impurities | 4.58 | 2.15 | 7.28 | 5.39 | 2.48 | 9.04 |

EXAMPLE 6

The pass stream from Comparative Example 1, operated in batch mode was diluted in the ratio 1:1 with distilled water and the resulting feed solution containing 57.1 gpl of NaSCN was fed to membrane module, 6, containing hydrophilized polyamide membrane (HPA-400), 25. High pressure pump, 4, was turned on and the pressure was maintained at 24 bar. The pass stream was recycled back at a constant flow rate of 17 liters per minute. An overall volume recovery of 50% was achieved with an average flux in between of 79 lit.m.sup.–2.hr.sup.–1 and 80 lit.m.sup.–2.hr.sup.–1. The color and impurity rejections were found to be 95% and 80% respectively. The pass stream from Comparative Example 5, operated in a continuous mode, was diluted in the ratio 1:0.75 with deionized water passing through conduit D1. The resulting solution containing 62.9 gpl of NaSCN was fed to membrane module 19B. The pressure control valve 20B was used to maintain feed pressure at 24 bar and the pass flow rate was kept at 2 liters per minute. An overall volume recovery of 60% was achieved with an average flux in between 40 lit.m.sup.–2.hr.sup.–1 and 42 lit.m.sup.–2.hr.sup.–1. The color and impurity rejections were found to be 93% and 72% respectively. The comparison of the results for the batch and continuous process is given in Table 6 below.

TABLE 6

| Quality parameters | Hydrophilized polyamide HPA-400 Continuous mode | | | Hydrophilized polyamide HPA-400 Batch mode | | |
|---|---|---|---|---|---|---|
| | Feed | Permeate | Pass | Feed | Permeate | Pass |
| NaSCN (%) | 6.29 | 7.43 | 5.73 | 5.71 | 6.59 | 5.14 |
| Color (APHA) | 275 | 20 | 641 | 298 | 14 | 623 |
| Total impurities (%) | 4.63 | 2.16 | 7.26 | 4.90 | 1.93 | 7.61 |

EXAMPLE 7

The pass stream from Comparative Example 2, operated in batch mode was diluted in the ratio 1:1 with deionized water and the resulting feed solution containing 28.7 gpl of NaSCN was fed to membrane module no 6 containing HPA-400, 25. The pressure was maintained at 24 bar. An overall volume recovery of 60% was achieved with an average flux in between 53 lit.m.sup.–2.hr.sup.–1 and 54 lit.m.sup.–2.hr.sup.–1.

The color and impurity rejections were found to be 96% and 79% respectively. The pass stream from Comparative Example 2, operated in continuous mode was diluted by conduit D2 in the ratio 1:0.75 and the resulting solution containing 32.3 gpl NaSCN was fed to a membrane module no. 19C containing HPA-400, 25. The pressure control valve 20.degree. C. was adjusted to maintain a feed pressure of 24 bar and the reject flow rate was maintained at 2 liters per minute. An overall volume recovery of 60% was achieved with an average flux in between 34 lit.m.sup.-2.hr.sup.-1 and 35 lit.m.sup.-2.hr.sup.-1. The color and impurity rejections were found to be 96% and 77% respectively. The comparison of the results for the batch and continuous process is in Table 7 below.

TABLE 7

| Quality parameters | Hydrophilized polyamide HPA-400 Continuous mode | | | Hydrophilized polyamide HPA-400 Batch mode | | |
|---|---|---|---|---|---|---|
| | Feed | Permeate | Pass | Feed | Permeate | Pass |
| NaSCN (%) | 3.23 | 3.73 | 2.43 | 2.87 | 3.55 | 2.42 |
| Color (APHA) | 571 | 23 | 472 | 316 | 12 | 678 |
| Total impurities (%) | 3.91 | 1.23 | 6.9 | 4.12 | 1.48 | 5.06 |

The drawback of the batch and continuous process employed, is the excess addition of distilled water which reduced the overall sodium thiocyanate concentration in the permeate. The dilution ratio has to be optimized in order to achieve maximum recovery of sodium thiocyanate in permeate and also to maintain a concentration of 10% of NaSCN in the permeate solution.

This study showed that the percentage rejection of impurities and color is similar for both batch and continuous process for each stage of operation.

EXAMPLE 8

A batch of 60 liters of feed volume containing 120 gpl of NaSCN was fed to a feed tank no-17. High pressure pump 18A was turned on and the feed solution was fed to module no 19A containing HPA-400, 25, by adjusting the feed side pressure to 18 bar using pressure control valve 20A, which was maintained constant during the run. 30 liters of the permeate was collected for a duration of 49 minutes obtaining a recovery by volume of 50%. The color and impurity rejections were found to be 85% and 79% respectively. The feed, permeate and pass samples were analyzed for NaSCN, color and total impurities and are as shown in Table 8 below.

TABLE 8

| Quality parameters | Hydrophilized polyamide membrane (HPA-400) | | |
|---|---|---|---|
| | Feed | Permeate | Pass |
| NaSCN (Conc %) | 12.1 | 13.49 | 10.17 |
| Total impurities (%) | 5.33 | 2.2 | 8.16 |
| Color (APHA units) | 221 | 23 | 418 |

EXAMPLE 9

In this example, the pass stream of the Example 5 was diluted with distilled water flowing through the conduit D1 in the ratio 1:0.5. A starting volume of 42 liters containing 79 gpl of NaSCN was fed to module no. 19B containing HPA-400 membrane, 25. High-pressure pump, 18B, was turned on and the pressure on the feed side was adjusted to 18 bar and was maintained constant during the run. 15 liters of the permeate was collected for a duration of 30 minutes obtaining an overall volume recovery of 50%. The color and the impurity rejections were found to be 96% and 77% respectively. The feed stream, pass stream and permeate stream were analyzed for % NaSCN, % total impurities and color and results are shown in Table 9 below.

TABLE 9

| Quality parameters | Hydrophilized Polyamide membrane (HPA-400) | | |
|---|---|---|---|
| | Feed | Permeate | Pass |
| NaSCN (conc %) | 7.9 | 9.02 | 7.14 |
| Total impurities (%) | 5.54 | 2.53 | 8.37 |
| Color (APHA units) | 276 | 10 | 521 |

EXAMPLE 10

In this example, the reject from Example 6 was further diluted in the ratio 1:0.75. 30 liters of the solution having a composition 45.4 gpl of NaSCN was fed through module no 19C containing HPA-400 membrane, 25. High pressure pump, 18C, was turned on and was maintained at 18 bar during the run. 18 liters of permeate was collected achieving an overall volume recovery of 60%. The color and impurity rejections were found to be 79% and 72% respectively. The feed, pass and permeate samples are analyzed for % NaSCN, % impurities and color and the results are shown in Table 10 herebelow.

TABLE 10

| Quality parameters | Hydrophilized polyamide membrane (HPA-400) | | |
|---|---|---|---|
| | Feed | Permeate | Pass |
| NaSCN (Conc %) | 4.54 | 5.48 | — |
| Total impurities (%) | 5.14 | 2.45 | 8.37 |
| Color (APHA units) | 277 | 57 | 601 |

The average flux for Examples 5–7 varied between 35 lit.m.sup.-2.hr.sup.-1 and 54 lit.m.sup.-2.hr.sup.-1. The analyzed permeate samples at this pressure showed considerably high concentration of NaSCN in permeate, with acceptable color and impurity rejections at a pressure of 18 bar.

This experiment was carried out at 18 bar to find the optimal range of pressure at which the system can be operated which gives acceptable rejection of impurities so that the operating costs can be minimized.

EXAMPLE 11

In this example, performance of the various membrane materials are compared. The results of the comparison are given in Table 11 given herebelow.

TABLE 11

| Membrane material | NaSCN % F | NaSCN % P | NaSCN % R | % Total impurities F | % Total impurities P | % Total impurities R | Color (APHA) F | Color (APHA) P | Color (APHA) R | Flux range L/m²hr |
|---|---|---|---|---|---|---|---|---|---|---|
| Cellulose triacetate (CTA-1000) Single stage only | 13.51 | 16.88 | 11.27 | 5.54 | 3.17 | 9.42 | 98 | 23 | 209 | 28–30 |
| Polyamide (PA-300) stage-1 | 8.6 | 10.33 | 6.54 | 5.54 | 0.54 | 11.26 | 198 | 4 | 413 | 8–10 |
| Polyamide (PA-300) stage-2 | 3.73 | 5.3 | 2.57 | 6.26 | 0.67 | 11.13 | 239 | 3 | 447 | 6–8 |
| Polyamide (PA-300) stage-3 | 1.19 | 1.84 | 0.73 | 5.06 | 0.25 | 8.48 | 234 | 13 | 422 | 8–10 |
| Hydrophilized polyamide (HPA-400) stage-1 | 12.1 | 13.49 | 10.17 | 5.33 | 2.2 | 8.16 | 221 | 23 | 418 | 35–40 |
| Hydrophilized polyamide (HPA-400) stage-2 | 7.9 | 9.02 | 7.14 | 5.54 | 2.53 | 8.37 | 276 | 10 | 521 | 41–48 |
| Hydrophilized polyamide (HPA-400) stage-3 | 4.54 | 5.48 | — | 5.14 | 2.45 | 8.37 | 277 | 57 | 601 | 49–54 |

Experiment with cellulose triacetate was carried only for a single stage because the percentage impurity in the permeate is quite high which shows the low rejection of impurities and also presence of color in the permeate sample makes it unacceptable as per the guidelines. So further experiments with CTA were not carried out.

We claim:

1. A process for recovery of sodium thiocyanate from industrial process solution containing a color imparting ion, al least one component selected from the group consisting of β-sulfo propionic acid and β-sulfo propionitrile, and optionally at least one member selected from the group consisting of an organic compound, an inorganic compound, and a bivalent salt by membrane based nanofiltration technique, said process comprising the steps of: passing the industrial process solution as a feed solution through a nanofiltration membrane with simultaneous application of positive pressure to provide a pass solution and a permeate solution, wherein the permeate solution is substantially devoid of the at least one component and the color imparting ion, and evaporating the permeate solution to obtain sodium thiocyanate.

2. A process as claimed in claim 1 wherein the feed solution contains the bivalent salt, the color imparting ion, the organic compound, and the inorganic compound.

3. A process as claimed in claim 1 wherein the feed solution contains sodium thiocyanate in a concentration in excess of 100 gpl.

4. A process as claimed in claim 1 wherein the feed solution contains sodium thiocyanate in a concentration between 110 gpl and 120 gpl.

5. A process as claimed in claim 1 wherein the process solution comprises at least two member selected from the group consisting of the organic compound, the inorganic compound, and the bivalent salt.

6. A process as claimed in claim 1, wherein the process comprises multiple stages wherein the pass solution from a previous stage is diluted using distilled water and used as feed solution for a next stage.

7. A process as claimed in claim 1 or claim 6, wherein the feed solution or the diluted pass solution is passed through one or more nanofiltration membrane modules connected in series so as to produce second and/or subsequent pass solutions, consecutively, which are then finally disposed.

8. A process as claimed in claim 1, wherein the nanofiltration membrane used is selected from the group consisting of a cellulose triacetate membrane, a polyamide membrane, and a hydrophilised polyamide membrane.

9. A process as claimed in claim 1, wherein the nanofiltration membrane has an active membrane area of about 1 m².

10. A process as claimed in claim 1, wherein the pressure applied to the feed solution at the time of passing the feed solution through the nanofiltration membrane is equal to or greater than an osmotic pressure difference between the feed/pass solution on one side and the permeate solution of the other side of the membrane.

11. A process as claimed in claim 1, wherein the process is operated under flux whose value is in the range of 25 to 40 $Lm^2hr^{-1}$.

* * * * *